May 3, 1932. T. V. BUCKWALTER 1,856,240
PROCESS OF MAKING PISTON RINGS
Original Filed Oct. 17, 1930
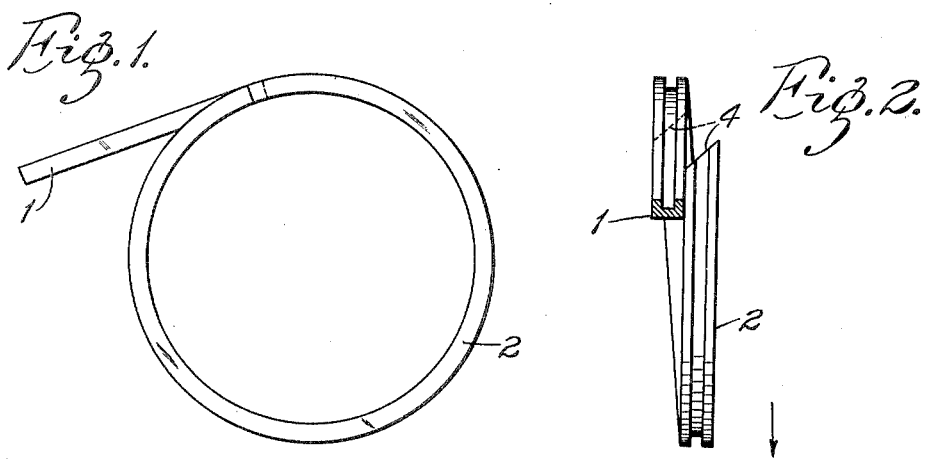
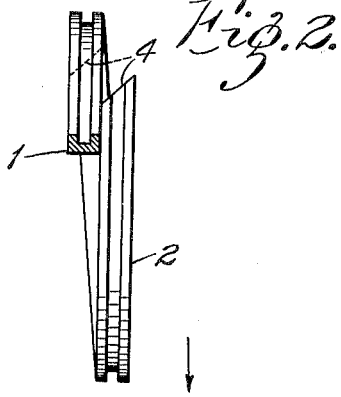
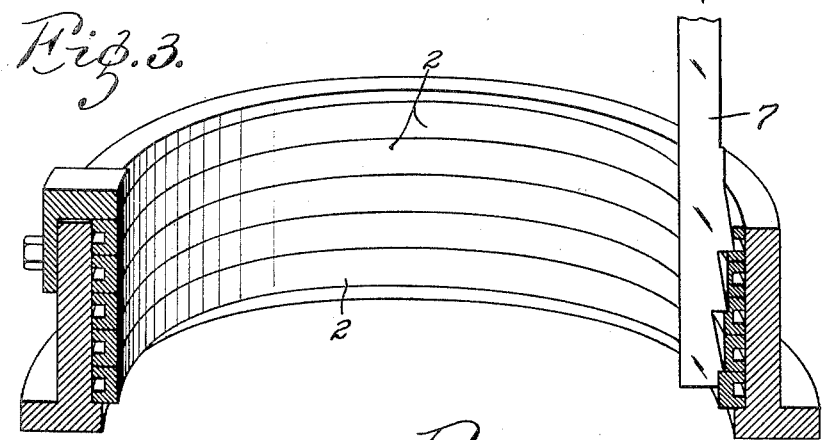
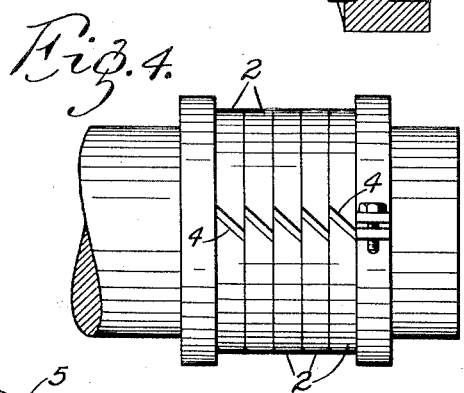
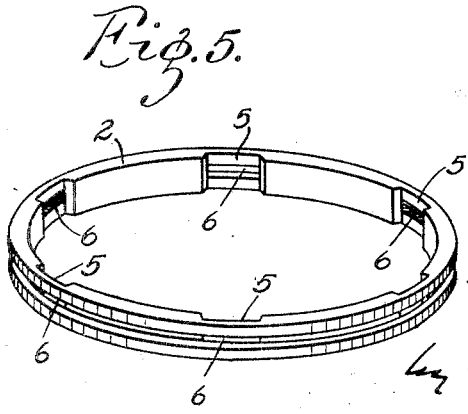
INVENTOR:
Tracy V. Buckwalter
by Connor Carrett Growby
HIS ATTORNEYS Patented May 3, 1932

1,856,240

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

PROCESS OF MAKING PISTON RINGS

Original application filed October 17, 1930, Serial No. 489,413. Divided and this application filed May 1, 1931. Serial No. 534,165.

My invention relates to piston rings of the type that are provided with circumferential grooves, and especially to rings of this type that are provided with slots extending radially through the bottom of the circumferential groove. Heretofore, it has been the practice to cut such radial slots with a circular saw, which involves considerable expense and produces a hole which is much longer at its outer end than at its inner end. Likewise, piston rings are now made mainly of cast metal, particularly cast iron, and the manufacture thereof is expensive. The principal object of the present invention is to devise a simple, rapid and inexpensive process of making a piston ring of the type above mentioned, said piston ring constituting the subject matter of my co-pending application Serial No. 489,413 filed October 17, 1930, of which the present application is a division. The invention consists principally in forming a longitudinally grooved strip of approximately the same cross-section as the piston ring, curving the end portion of such strip into a circumferentially grooved ring, severing such ring and then cutting in its inner surface longitudinal grooves of sufficient depth to remove the full thickness of the metal at the bottom of the circumferential groove. It also consists in the details of operation as hereinafter described and claimed.

In the accompanying drawings wherein like reference numerals refer to like parts wherever they occur, Fig. 1 is a view of a wire or flank of channel section with the end thereof bent into a helical coil, Fig. 2 is an edge view thereof, the dotted line therein showing where the wire is to be cut to convert the coil into a split ring.

Fig. 3 is a diagrammatic view showing a group of ring blanks contracted in a shell of substantially the same diameter as that of the cylinder with which the rings are to be used and clamped together while longitudinal grooves are being cut in the inner surface thereof with a broach.

Fig. 4 is a diagrammatic view illustrating a group of rings clamped together on a mandrel preparatory to heat treatment, and Fig. 5 is an isometric projection of a finished ring.

In carrying out my process, I start preferably with a strip 1 of flat wire or the like. Preferably this wire is made of steel and is channel-shaped and of substantially the same cross-section as the cross-section of the finished piston ring taken between its radial slots. In case a flat wire is used, it is suitably rolled or drawn into channel section. The end portion 2 of the channeled wire or strip is curved or coiled into helical or circular form, as by coiling over a suitable core or mandrel. Each coil or turn of about 360 degrees is severed from the strip, preferably by an oblique cut 4 so located and arranged that, when the ends of the helical coil are brought into the same plane with the body of the coil, its inclined end faces will overlap each other with a slight clearance space between them.

At some convenient stage in the manufacture of the ring, longitudinal grooves 5, that is, grooves that extend crosswise of the strip and substantially parallel with the axis of the ring, are cut at intervals either in the inner surface of the coil or ring or on the flat side of the initial strip or blank. Such longitudinal grooves are cut deep enough to communicate with the circumferential groove thus forming radial slots 6 in the bottom thereof. They may be made with any suitable cutting tool, preferably a broach 7 which moves substantially parallel with the axis of the ring as shown in Fig. 3.

The rings are subjected to any suitable heat treatment as indicated, for instance, in Fig. 4; but, as my invention is not concerned with heat treatment or apparatus, it is considered unnecessary to describe them.

The process above described of forming rings out of channeled strips and of forming radial slots in the bottom of the circumferential groove is obviously considerably cheaper than the common practice of cutting such slots with a circular saw. Besides, such slots may be made of any length, number and arrangement desired. Likewise, the process has the advantage of utilizing steel wire and the product is harder, more elastic and more durable than rings of cast iron.

What I claim is:

1. The improvement in the process of making piston rings which consists in forming longitudinal grooves in the inner surface of a circumferentially grooved ring, the longitudinal grooves being of sufficient depth to communicate with the circumferential groove.

2. The process of making piston rings which comprises coiling a grooved strip into a split ring with the groove in the outer surface thereof, and cutting in the inner surface of such ring longitudinal grooves of sufficient depth to communicate with the circumferential groove.

3. The process of making piston rings which comprises coiling a grooved strip of steel into a split ring with the groove in the outer surface thereof, and cutting in the inner surface of such ring longitudinal grooves of sufficient depth to communicate with the circumferential groove.

4. The process of making piston rings which comprises working a grooved strip of steel into a split ring with a circumferential groove in its outer surface and afterwards grooving the inner surface longitudinally with respect to the axis of such ring to such depth that radial slots are formed in the bottom of said circumferential groove.

Signed at Canton, Ohio, this 16 day of Apr. 1931.

TRACY V. BUCKWALTER.